United States Patent
Sherman et al.

(10) Patent No.: US 12,516,225 B2
(45) Date of Patent: Jan. 6, 2026

(54) MULTI-LAYER ADHESIVES AND ARTICLES

(71) Applicant: Solventum Intellectual Properties Company, Maplewood, MN (US)

(72) Inventors: Audrey A. Sherman, Woodbury, MN (US); Mark F. Ellis, St. Paul, MN (US); Barbara L. Kellen, Baldwin, WI (US); David A. Cadalbert, Baldwin, WI (US)

(73) Assignee: Solventum Intellectual Properties Company, Maplewood, MN (US)

( * ) Notice: Subject to any disclaimer, the term of this patent is extended or adjusted under 35 U.S.C. 154(b) by 619 days.

(21) Appl. No.: 17/417,695

(22) PCT Filed: Dec. 27, 2019

(86) PCT No.: PCT/IB2019/061399
§ 371 (c)(1),
(2) Date: Jun. 23, 2021

(87) PCT Pub. No.: WO2020/136614
PCT Pub. Date: Jul. 2, 2020

(65) Prior Publication Data
US 2022/0073792 A1    Mar. 10, 2022

Related U.S. Application Data

(60) Provisional application No. 62/785,450, filed on Dec. 27, 2018.

(51) Int. Cl.
| | | |
|---|---|---|
| C09J 7/38 | (2018.01) | |
| C08F 220/06 | (2006.01) | |
| C08F 220/18 | (2006.01) | |
| C08F 220/20 | (2006.01) | |
| C08G 77/20 | (2006.01) | |

(52) U.S. Cl.
CPC ............ *C09J 7/385* (2018.01); *C08F 220/06* (2013.01); *C08F 220/1804* (2020.02); *C08F 220/1808* (2020.02); *C08F 220/20* (2013.01); *C08G 77/20* (2013.01); *C09J 2301/204* (2020.08); *C09J 2301/208* (2020.08); *C09J 2301/302* (2020.08); *C09J 2301/414* (2020.08); *C09J 2301/416* (2020.08); *C09J 2433/00* (2013.01); *C09J 2483/00* (2013.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 3,645,835 | A | 2/1972 | Hodgson |
| 3,786,116 | A | 1/1974 | Milkovich |
| 3,842,059 | A | 10/1974 | Milkovich |
| 4,595,001 | A | 6/1986 | Potter |
| 4,693,935 | A | 9/1987 | Mazurek |
| 4,737,559 | A | 4/1988 | Kellen |
| 5,088,483 | A | 2/1992 | Heinecke |
| 5,160,315 | A | 11/1992 | Heinecke |
| 5,637,646 | A | 6/1997 | Ellis |
| 5,725,947 | A * | 3/1998 | Johannsen ........... C09J 7/30 |
| | | | 428/354 |
| 6,294,249 | B1 | 9/2001 | Hamer |
| 7,655,283 | B2 | 2/2010 | Sherman |
| 2004/0202879 | A1 | 10/2004 | Xia |
| 2006/0057367 | A1 * | 3/2006 | Sherman ............ C09J 7/22 |
| | | | 428/343 |
| 2008/0233348 | A1 | 9/2008 | Ishiwatari |
| 2009/0110861 | A1 * | 4/2009 | Sherman ............ C09J 7/10 |
| | | | 428/339 |
| 2011/0039099 | A1 | 2/2011 | Sherman |
| 2011/0212325 | A1 | 9/2011 | Determan |
| 2011/0300296 | A1 * | 12/2011 | Sherman ............ C08F 283/122 |
| | | | 524/588 |
| 2014/0287642 | A1 | 9/2014 | Kumar |
| 2016/0362588 | A1 * | 12/2016 | Moon ................ H10K 50/8426 |
| 2017/0189237 | A1 | 7/2017 | Locke |

FOREIGN PATENT DOCUMENTS

| | | |
|---|---|---|
| WO | WO 2010-056541 | 5/2010 |
| WO | WO 2010-056543 | 5/2010 |
| WO | WO 2012-027377 | 3/2012 |
| WO | WO 2013-173588 | 11/2013 |
| WO | WO 2014-011764 | 1/2014 |
| WO | WO 2018-017554 | 1/2018 |

OTHER PUBLICATIONS

Kawakami, "Silicone Macromers For Graft Polymer Synthesis", Polymer Journal, 1982, vol. 14, No. 11, pp. 913-917.

(Continued)

*Primary Examiner* — Anish P Desai

(57) ABSTRACT

Adhesive articles with multi-layer adhesive constructions include a substrate and a multi-layered adhesive. The multi-layered adhesive includes a layer of a first adhesive in contact with the surface of the substrate, and a layer of siloxane-based pressure sensitive adhesive in contact with the first adhesive. The siloxane-based pressure sensitive adhesive includes a siloxane-(meth)acrylate co-polymer. The thickness of the siloxane-based pressure sensitive adhesive layer is less than the thickness of the first adhesive layer.

7 Claims, 2 Drawing Sheets

(56) References Cited

OTHER PUBLICATIONS

Kawakami, "Synthesis and Copolymerization of Polysilxoane Macromers", ACS Polymer Preprints, 1984, vol. 25, No. 01, pp. 245-246.
Kawakami, "Synthesis Of Silicone Graft Polymers And A Study Of Their Surface Active Properties", Die Makromolekulare Chemie, 1984, vol. 185, No. 09, pp. 09-18.
Smith, "Modern Optical Engineering", The Design of Optical Systems, 1966, pp. 104-105.
International Search Report for PCT International Application No. PCT/IB2019/061399, mailed on Jul. 1, 2020, 6 pages.

* cited by examiner

MULTI-LAYER ADHESIVES AND ARTICLES

FIELD OF THE DISCLOSURE

This disclosure relates to multi-layer adhesive constructions that may be used to form adhesive articles, such as tapes and other articles.

BACKGROUND

A wide range of adhesive articles are used in medical applications. These adhesive articles include gels used to attach electrodes and other sensing devices to the skin of a patient, a wide range of tapes to secure medical devices to a patient, and adhesive dressings used to cover and protect wounds.

Many of the adhesive articles use pressure sensitive adhesives. Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers, and silicones.

SUMMARY

This disclosure relates to adhesive articles that contain multi-layer adhesive constructions and methods of preparing such articles. In some embodiments, the adhesive articles comprise a first substrate comprising a first major surface and a second major surface, and a multi-layered adhesive. The multi-layered adhesive comprises a layer of a first adhesive with a first major surface and a second major surface, where the second major surface of the first adhesive is in contact with the first major surface of the first substrate, and a layer of siloxane-based pressure sensitive adhesive with a first major surface and a second major surface. The siloxane-based pressure sensitive adhesive comprises a siloxane-(meth)acrylate co-polymer, and the second major surface of the siloxane-based pressure sensitive adhesive is in contact with the first major surface of the first adhesive. The thickness of the siloxane-based pressure sensitive adhesive layer is less than the thickness of the first adhesive layer.

In other embodiments of adhesive articles, the adhesive article comprises a first substrate comprising a first major surface and a second major surface, and a multi-layered adhesive. The multi-layer adhesive comprises a continuous layer of a first adhesive with a first major surface and a second major surface, where the second major surface of the first adhesive is in contact with the first major surface of the first substrate, and a discontinuous second layer of adhesive. The second layer of adhesive has a first major surface and a second major surface. The second major surface of the second adhesive layer is in contact with the first major surface of the first adhesive. The thickness of the first adhesive layer is less than the thickness of the second adhesive layer, and the first adhesive and the second adhesive comprise different pressure sensitive adhesives.

Also disclosed are methods of preparing adhesive articles. In some embodiments, the method of preparing adhesive articles comprises providing a first substrate with a first major surface and a second major surface, and forming a multi-layer adhesive construction on the first major surface of the first substrate. Forming the multi-layer adhesive construction comprises providing a first adhesive composition or a first pre-adhesive composition, where the pre-adhesive composition, upon curing forms an adhesive composition, disposing the first adhesive or pre-adhesive composition on at least a portion of the first major surface of the first substrate to form a first adhesive or pre-adhesive layer with a first major surface and a second major surface, where the second major surface of the first adhesive or pre-adhesive layer is in contact with the first major surface of the first substrate. A siloxane-based pressure sensitive adhesive composition is disposed on the first major surface of the first adhesive or pre-adhesive layer to form a siloxane-based pressure sensitive adhesive layer with a first major surface and a second major surface, where the second major surface of the siloxane-based pressure sensitive adhesive layer is in contact with the first major surface of the first adhesive or pre-adhesive layer. The siloxane-based pressure sensitive adhesive composition comprises a siloxane-(meth)acrylate co-polymer. The thickness of the siloxane-based pressure sensitive adhesive layer is thinner than the thickness of the first adhesive or pre-adhesive layer. The formed adhesive construction is exposed to radiation.

BRIEF DESCRIPTION OF THE DRAWINGS

The present application may be more completely understood in consideration of the following detailed description of various embodiments of the disclosure in connection with the accompanying drawings.

Figure 1:
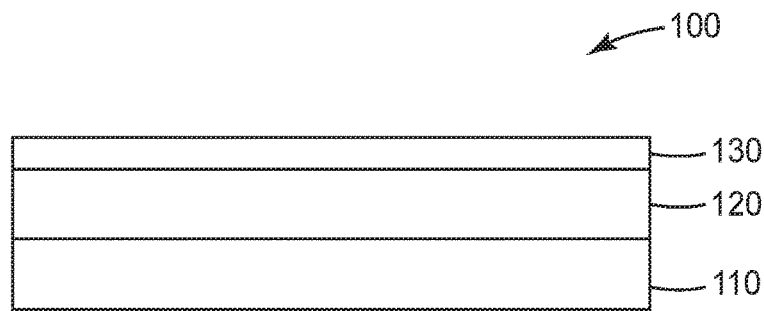
FIG. 1 shows a cross sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The use of adhesive products in the medical industry has long been prevalent, and is increasing. However, while adhesives and adhesive articles have shown themselves to be very useful for medical applications, there are also issues in the use of adhesives and adhesive articles. Medical adhesive-related skin injury (MARSI) has a significant negative impact on patient safety. Skin injury related to medical adhesive usage is a prevalent but under recognized complication that occurs across all care settings and among all age groups. In addition, treating skin damage is costly in terms of service provision, time, and additional treatments and supplies.

Skin Injury occurs when the superficial layers of the skin are removed along with the medical adhesive product, which not only affects skin integrity but can cause pain and the risk of infection, increase wound size, and delay healing, all of which reduce patients' quality of life.

Medical adhesive tape can be simply defined as a pressure-sensitive adhesive and a backing that acts as a carrier for the adhesive. The US Food and Drug Administration more specifically defines a medical adhesive tape or adhesive bandage as "a device intended for medical purposes that consists of a strip of fabric material or plastic, coated on one side with an adhesive, and may include a pad of surgical dressing without a disinfectant. The device is used to cover and protect wounds, to hold together the skin edges of a wound, to support an injured part of the body, or to secure objects to the skin."

While the pathophysiology of MARSI is only partially understood, skin injury results when the skin to adhesive attachment is stronger than skin cell to skin cell attachment. When adhesive strength exceeds the strength of skin cell to skin cell interactions, cohesive failure occurs within the skin cell layer.

The intrinsic characteristics of all components of an adhesive product must then be taken into account to address these factors that may lead to MARSI. Properties of the adhesive to be considered include cohesiveness over time and the corresponding adhesion strength; properties of the tape/backing/dressing to be considered include breathability, stretch, conformability, flexibility, and strength.

The widespread use of adhesives in medical applications has led to the development of adhesives and adhesive articles that are gentle to the skin. Some of these adhesives are pressure sensitive adhesives and others are gel adhesives. The application of pressure sensitive adhesives, including silicone pressure sensitive adhesives, for adhering to skin is known in the art and many examples are commercially available. However, some pressure sensitive adhesives have issues that limit their use for adhesion to skin. For instance, skin damage may result during the removal of a pressure sensitive adhesive that exhibits surface adhesion to skin that is too high. Alternatively, if the surface adhesion to skin is reduced, the pressure sensitive adhesive may lack sufficient holding power to be useful. Additionally, some pressure sensitive adhesives that are relatively rigid or non-conformable compared to skin typically result in considerable patient discomfort during use. Also, even adhesives that have a measured low peel adhesion to skin may cause discomfort during removal, e.g., if the adhesive becomes surface attached around hair.

Another class of adhesives used in medical applications are silicone gels. As used herein, the terms "siloxane" and "silicone" are used interchangeably. The term siloxane is replacing silicone in common usage, but both terms are used in the art. Silicone gel (crosslinked poly dimethylsiloxane ("PDMS")) materials have been used for dielectric fillers, vibration dampers, and medical therapies for promoting scar tissue healing. Commercially available silicone gels are soft, tacky, elastic materials that comprise relatively high levels of fluids (liquids). Silicone gels are typically softer than silicone pressure sensitive adhesives, resulting in less discomfort when adhered to and removed from skin. The combination of low skin trauma upon removal and low skin irritation upon wearing, make silicone gels suitable for gentle to skin adhesive applications.

Examples of commercially available silicone gel adhesive systems include products marketed with the trade names: Dow Corning MG 7-9850, WACKER 2130, BLUESTAR 4317 and 4320, and NUSIL 6345 and 6350. These gentle to the skin adhesives are formed by an addition cure reaction between vinyl-terminated PDMS and hydrogen terminated PDMS, in the presence of a hydrosilylation catalyst (e.g., platinum complex). Vinyl-containing and hydrogen-containing PDMS chains are referred to as 'functionalized' silicones due to their specific curable chemical moieties. Individually, such functional silicones are generally not reactive; however, together they form a reactive silicone system. Generally, due to processing requirements such as the need to be solventless, the desired formulation lifetime, and the reaction kinetics of the curing reactions, these reactive siloxane systems typically use functional PDMS fluids with low viscosities and thus low molecular weights. Additionally, silicone resins (tackifiers sometimes referred to as "silicate resins") and PDMS with multiple hydrogen functionalities (crosslinkers) can be formulated to modify the adhesive properties of the gel.

There are downsides to the use of these types of materials. For example, they required the use of specialized "functionalized" silicone materials. Also, they typically require the use of a catalyst, often a heavy metal-containing catalyst such as platinum or palladium catalysts. These catalysts are expensive and leave heavy metal-containing residues in the cured compositions. An alternative to the catalyst-promoted curing of such silicone materials is the use of free radical polymerization to cure or crosslink the silicone pressure sensitive adhesive or gel formulations. These polymerizations require initiation by a free radical source, such as, for example, the high temperature degradation of organic peroxides. However, organic peroxides can be unstable and even explosive and thus can be undesirable. Also, these cured materials, while they may be gentle to the skin, they generally have low adhesive holding power and low skin adhesion. Low skin adhesion and low adhesive holding power is often the trade off to achieve low skin trauma adhesives.

Recently siloxane-based gel adhesives and sealants have been prepared that cure and crosslink at room temperature without generating undesirable catalyst or initiator residues and do not require specialized functionalized starting materials, rather they are prepared either from silanol-functional siloxane materials or siloxane materials without any reactive functional groups. These siloxane-based gel compositions can be formed by a condensation reaction in the case of silanol-functional materials, or by the generation of free radicals by exposure to an electron beam (e-beam) or gamma radiation in the case of siloxane materials without any reactive functional groups. In the condensation reaction, two silanol groups (that is to say, terminal —SiOH groups) condense to form —Si—O—Si— linkages and a molecule of water ($H_2O$).

These siloxane-based gel adhesives and sealants have excellent wetting and flow characteristics, due to the very low glass transition temperature (Tg) and modulus of the polysiloxane network and achieve their adhesive holding power on the rough skin surface due to mechanical interlock and energy dissipation within the gel adhesive. Additionally, the low surface adhesion of silicone gels prevents the adhesive from tightly attaching to hair or skin cells during skin wear, further reducing the instance of pain during removal. This results in minimal to no skin trauma upon removal.

Thus, the use of pressure sensitive adhesives in medical applications have issues because they can have good adhesion to a wide variety of substrates (for example, to skin as well as to tubing, drapes, tape backings, and the like) but they can cause skin damage. Gel adhesives on the other hand can have desired low skin trauma, but these adhesives also have low adhesion, both to skin and to other substrates such as tubing, drapes, tape backings, and the like. Thus, the need remains for adhesives suitable for medical uses that have high adhesion to a wide range of substrates without causing skin damage.

One possible solution to the problems of high adhesion without skin damage is to use multi-layer constructions. In this way, the surface properties of the adhesive can be different from the bulk properties of the construction. In this way, the surface properties of the construction can be modified without modifying the bulk properties of the construction. For example, modifying an adhesive construction that does not adhere strongly to human skin with a thin layer of a different adhesive that does strongly adhere to human skin can give the desirable surface features without having to make an entire adhesive construction that has these features.

However, having two different types of adhesive layers in a single construction provides a variety of advantages as well as a variety of challenges. One of the advantages has been described above, namely the ability to modify the surface adhesive properties without having to change the bulk adhesive. Among the challenges of having two different types of adhesive layers in the adhesive construction can include the potential for a weak boundary layer between the two adhesive layers. By this it is meant that because the two adhesive layers are different, they may not bond well to each other creating a weak bond between the two pressure sensitive adhesive layers (often called a "weak boundary layer"). This weak boundary layer can be problematic in that it can become a locus of failure when the construction is used to form adhesive bonds.

In this disclosure, multilayer adhesive constructions are presented which have two different adhesive layers. The articles of this disclosure use a combination of chemical properties and physical properties to achieve the desired surface adhesion without causing skin damage. In some embodiments, different chemical compositions, such as siloxane-based and (meth)acrylate based pressure sensitive adhesives are used. In other embodiments, physical properties are used, such as the use discontinuous adhesive layers with voids to decrease the surface adhesion. In some embodiments, both chemical and physical properties are used.

There are two different classes of embodiments that incorporate two different adhesive layers. In both embodiments, the two layers are of different thicknesses, with one of the layers being considerably thinner than the other layer. One of the embodiments utilizes a thin layer of a siloxane-based pressure sensitive adhesive layer to affect the surface properties of the adhesive article. In the other embodiment, a thin primer layer of pressure sensitive adhesive is covered with a discontinuous adhesive layer. In this embodiment, the discontinuity of the surface adhesive controls the surface properties of the adhesive article, and the thin underlying layer of adhesive provides additional adhesion to raise the overall adhesion level without increasing the undesirable skin damage issues.

In the first class of embodiments, the constructions include a first adhesive layer which is the relatively thick layer, and a relatively thin layer of siloxane-based pressure sensitive adhesive comprising a siloxane-(meth)acrylate copolymer. This siloxane-based pressure sensitive adhesive layer may be continuous or discontinuous. The first adhesive layer may be a (meth)acrylate-based pressure sensitive adhesive or a siloxane-based gel adhesive. In the constructions, the bulk properties are influenced by the first adhesive layer and the surface properties are influenced by the siloxane-based pressure sensitive adhesive layer. For example, if the first adhesive layer is a siloxane-based gel adhesive with low surface adhesion but desirable softness, the low surface adhesion can be overcome by the presence of the siloxane-based pressure sensitive adhesive without sacrificing the desirable softness. In other examples, if the first adhesive layer is a (meth)acrylate-based pressure sensitive adhesive, the effect of surface modification by the siloxane-based pressure sensitive adhesive is even more pronounced. In some instances, the (meth)acrylate-based pressure sensitive adhesives can bond too aggressively to skin and cause skin damage. This is particularly true when the adhesive remains in contact with the skin for extended periods. Over time, the adhesion between the pressure sensitive adhesive and the skin can build significantly leading to MARSI upon removal of the adhesive article. It has been found that the use of siloxane-based pressure sensitive adhesive, either as a continuous or a discontinuous layer on the surface of the first adhesive layer can moderate the adhesion to skin, especially by preventing the build up of adhesion to skin over time, and permit easier removal without skin damage. This desirable modification of the first adhesive layer has been found to be a surface phenomenon, as merely blending the siloxane-based pressure sensitive adhesive with a (meth)acrylate-based pressure sensitive adhesive does not show this same effect.

Additionally, another problem that can occur with medical adhesive tapes is that the adhesive layer tends to attract dust and other debris at the edges where the adhesive/skin bond is exposed to the air. Upon removal of the adhesive article from the skin, this debris is often left behind on the skin in what is sometimes called the "black ring problem". The use of the multi-layer adhesive articles of this disclosure removes this problem as well.

In the second class of embodiments of this disclosure, a first thin layer of pressure sensitive adhesive is disposed on a substrate surface. To this surface is disposed a discontinuous layer of a second pressure sensitive adhesive that is different from the first pressure sensitive adhesive. The discontinuous layer of pressure sensitive adhesive may be patterned, such that the adhesive surface contains a pattern of voids where the voids expose the underlying thin layer of pressure sensitive adhesive. The discontinuous nature of the second pressure sensitive adhesive is a method for providing the moderated adhesion level to mitigate the issues with skin damage. However, the decreased surface adhesion can moderate the adhesion level to such an extent that the adhesive article can fall off in use. To overcome this issue, the first layer of pressure sensitive, because portions of it are exposed by the voids in the second layer of pressure sensitive adhesive, can help to raise the adhesive levels. In use, the tape can be pressed to target surface to which it is attached and this pressing, typically just moderate finger pressure, can compress the second layer of pressure sensitive adhesive making it sufficiently thin that the underlying first layer of pressure sensitive adhesive can at least partially contact the target surface, and adhere. This secondary adhesive contact can increase the overall adhesion to the target surface, and yet Thus, the downside of using of a structured adhesive surface to moderate the adhesion levels to prevent skin damage, can be overcome by using an underlying thin layer of pressure sensitive adhesive.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives and gel adhesives.

Pressure sensitive adhesive compositions are well known to those of ordinary skill in the art to possess properties including the following: (1) aggressive and permanent tack, (2) adherence with no more than finger pressure, (3) sufficient ability to hold together two adherends, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "gel adhesive" refers to a tacky semi-solid crosslinked matrix containing a liquid or a fluid that is capable of adhering to one or more substrates. Fluid as used herein refers to materials that flow and includes not only liquids but also gums. The gel adhesives may have some properties in common with pressure sensitive adhesives, but they are not pressure sensitive adhesives.

The term "siloxane or siloxane-based" as used herein refers to polymers that contain units with dialkyl or diaryl siloxane (—SiR$_2$O—) repeating units. The siloxane-based polymers may be segmented copolymers or polysiloxane polymers. The terms silicone and siloxane are used interchangeably.

The term "unsaturated" when referring to functional groups, refers to a carbon-carbon multiple bond, typically a carbon-carbon double bond. When an unsaturated double bond is a terminal group, it is generally referred to as an ethylenically unsaturated group, which has the general structure —CH=CH$_2$. Ethylenically unsaturated groups are also sometimes called "free radically polymerizable groups". Examples of unsaturated groups are vinyl groups and (meth)acrylate groups.

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups. The term "(meth)acrylate-based" refers to polymeric materials that comprise at least a majority of (meth)acrylate monomers, that is to say at least 50% by weight (meth)acrylate, and may contain additional non-(meth)acrylate monomers.

The term "curing" as used herein refers to a polymerization reaction in which reactive groups, either present in a molecule or generated by an activation mechanism, react to form a higher molecular weight molecule. This reaction may or may not involve crosslinking. The term "crosslinking" refers to a reaction that forms a polymeric matrix, where all of the component elements of the matrix are linked together such that none of the components contained within the matrix are extractable. While in the polymer arts the terms "curing" and "crosslinking" are used interchangeably, it should be noted that not all curing reactions involve crosslinking.

As used herein the term "polymer" refers to a macromolecule that is a homopolymer or a copolymer. As used herein, the term "homopolymer" refers to a polymeric material that is the reaction product of one monomer, and the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl. Simple alkyl groups are abbreviated herein as methyl=Me, ethyl=Et, n-propyl=Pr.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl. The simple aryl group phenyl is abbreviated herein as Ph.

The term "alkoxy" refers to a monovalent group of formula —OR$^a$ where R$^a$ is an alkyl group. The term "aryloxy" refers to a monovalent group of formula —OR$^a$ where R$^a$ is an aryl group.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —CH$_2$CH$_2$ (OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aralkylene" refers to a divalent group of formula —$R^a$—$Ar^a$— where $R^a$ is an alkylene and $Ar^a$ is an arylene (i.e., an alkylene is bonded to an arylene).

The term "condensable end group" refers to a monovalent self-reactive terminal group of general formula: —$SiR_2$(OX), where R is an alkyl group and X is a H or R group.

The term "actinic radiation" as used herein refers to radiation that is capable of effecting curing. Actinic radiation includes Ultra Violet (UV) radiation, gamma radiation and electron beam radiation.

The terms "room temperature" and "ambient temperature" are used interchangeably and refer to a temperature of from 20-25° C.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art As used herein, a "microstructured material" refers to a material that includes at least one surface having one or more microscopic features.

As used herein, a "microstructured" surface means that the surface has a configuration of features in which at least 2 dimensions of the features are microscopic. As used herein, the term "microscopic" refers to features of small enough dimension so as to require an optic aid to the naked eye when viewed from a plane of view to determine its shape. One criterion is found in Modern Optical Engineering by W. J. Smith, McGraw-Hill, 1966, pages 104-105 whereby visual acuity "is defined and measured in terms of the angular size of the smallest character that can be recognized." Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

Disclosed herein are adhesive articles and methods of preparing these adhesive articles. The adhesive articles are multi-layer adhesive articles and many of these multi-layer adhesive articles are useful as medical adhesives and in medical adhesive articles.

As was mentioned above, multi-layer adhesive articles have both advantages and disadvantages. One of the primary disadvantages is that the interface between the layers can be a weak boundary layer that can become the location of failure for the adhesive article. Therefore, it is desirable to prepare multi-layer adhesive articles where the layers retain their desirable properties and do not have weak boundary layers. In this disclosure, the interlayer adhesion is enhanced through the choice of the materials in the layers and in some embodiments through the use of radiation-initiated crosslinking. While not wishing to be bound by theory, it is believed that strong interlayer is achieved by choosing layer materials such that the layers have compatibility so that there is at least some intermixing at the interface of the layers, and exposure to radiation causes crosslinking across the boundary of the layers. In some cases, the radiation is electron beam or gamma radiation in which case no initiator is necessary to effect crosslinking, in other instances the radiation is ultraviolet (UV) radiation and a UV initiator is included in at least one of the layers.

Disclosed herein are adhesive articles. As discussed above, there are two general classes of embodiments of adhesive articles disclosed herein. All of the embodiments include a substrate and at least two layers of pressure sensitive adhesive or gel adhesive where the two adhesive layers are of different thickness and composition. Each of these classes of embodiments are described below.

In some embodiments of the first class of adhesive articles, the adhesive article comprises a first substrate comprising a first major surface and a second major surface, and a multi-layered adhesive construction. The multi-layered adhesive construction comprises a layer of a first adhesive with a first major surface and a second major surface, where the second major surface of the first adhesive is in contact with the first major surface of the first substrate, and a layer of siloxane-based pressure sensitive adhesive with a first major surface and a second major surface, comprising a siloxane-(meth)acrylate co-polymer, wherein the second major surface of the siloxane-based pressure sensitive adhesive is in contact with the first major surface of the first adhesive. The thickness of the siloxane-based pressure sensitive adhesive layer is less than the thickness of the first adhesive layer. The article has been exposed to actinic radiation.

In some embodiments, the siloxane-based pressure sensitive adhesive further comprises a UV initiator, and wherein the multi-layered adhesive has been exposed to UV radiation.

A wide variety of substrates are suitable for the articles of this disclosure. In many embodiments, the substrate comprises a substrate suitable for use in a medical article. Examples of suitable substrates include a polymeric film, a fabric, a non-woven, a foam, a paper, a mesh, an adhesive, or a release liner. In some embodiments, the breathable conformable backing comprises a high moisture vapor permeable film backings. Examples of such backings, methods of making such films, and methods for testing their permeability are described, for example, in U.S. Pat. Nos. 3,645,835 and 4,595,001.

Generally the backing is conformable to anatomical surfaces. As such, when the backing is applied to an anatomical surface, it conforms to the surface even when the surface is moved. Generally, the backing is also conformable to animal anatomical joints. When the joint is flexed and then returned to its unflexed position, the backing stretches to accommodate the flexion of the joint, but is resilient enough to continue to conform to the joint when the joint is returned to its unflexed condition.

Examples of particularly suitable backings can be found in U.S. Pat. Nos. 5,088,483 and 5,160,315, and include elastomeric polyurethane, polyester, or polyether block amide films. These films have a combination of desirable properties including resiliency, high moisture vapor permeability, and transparency.

A combination of substrate layers can also be used. For example, a backing substrate can used in conjunction with a release liner, such that one surface of the gel adhesive is in contact with the backing substrate, and the other is contact with a release liner. Other combinations can also be used.

As mentioned above, one of the goals of the gel adhesive compositions is high adhesion with low skin trauma and high shear holding power. The properties of the adhesive articles can be measured in a variety of ways. Adhesion to skin can be difficult to measure for a variety of reasons since there is a wide range of skin types, so human skin is not a standard substrate surface as is for example a glass plate, stainless steel plate or polymeric plate. Additionally, conducting adhesion tests on human skin requires the use of panels of volunteers. This makes testing expensive and complicated. Additionally, while adhesion to human skin is a desired result, adhesive articles such as medical adhesive articles frequently are called upon to adhere to a wide range of substrates such as tubing, drapes, and the like. Thus, while adhesion to skin is one feature measured for articles of this disclosure, other testing protocols are also carried out to characterize the adhesive articles. Among the desired features for the gel adhesive articles of this this disclosure is to have a 180° Peel Adhesion value to stainless steel of at least 10.0 Newtons/inch when measured according to the testing procedures described in the Examples section. Another desirable feature for the gel adhesive articles of this disclosure is to have a Static Shear Holding Power value with a 250 gram weight of at least 10,000 minutes, when measured according to the testing procedures described in the Examples section.

The articles may include additional optional layers. In some embodiments, it may be desirable for there to be a primer layer between the substrate surface and the gel adhesive layer. Generally, the primer layer comprises materials that are commonly referred to as "primers" or "adhesion promoters". Primers and adhesion promoters are materials that are applied as thin coatings on a surface and strongly adhere to the surface and provide a modified surface chemistry to the surface. Examples of suitable coating materials include polyamides, poly(meth)acrylates, chlorinated polyolefins, rubbers, chlorinated rubbers, polyurethanes, siloxanes, silanes, polyester, epoxies, polycarbodiimides, phenolics, and combinations thereof.

In some embodiments, it may be desirable that the second major surface of the substrate, that is to say the surface on which the adhesive construction is not coated, have a low adhesion coating. This is especially true if the gel adhesive article is to be supplied in the form of a tape. Many tapes are supplied as rolls, where the adhesive layer contacts the non-adhesive "back" side of the backing upon being rolled up. Often this non-adhesive surface of the backing has a low adhesion or release coating on it to permit the roll to be unwound. These low adhesion coatings are often called "low adhesion backsizes" or LABs. Many factors control whether an LAB coating is necessary or desirable, including the nature of the adhesive, the composition and topography of the backing, and the desired use for the tape article.

The multi-layer adhesive construction of this disclosure is disposed on the first major surface of the first substrate. The multi-layer adhesive construction comprises a first adhesive layer disposed on the substrate and a siloxane-based pressure sensitive adhesive disposed on the first adhesive layer.

In some embodiments, the first adhesive comprises a (meth)acrylate-based pressure sensitive adhesive. In other embodiments, the first adhesive comprises a siloxane gel adhesive. Each of these embodiments is described in greater detail below.

A wide range of (meth)acrylate-based pressure sensitive adhesives are suitable for use as the first adhesive layer. The (meth)acrylate-based pressure sensitive adhesive comprise at least one (meth)acrylate polymer and may contain additional components such as additional polymers, tackifying agents, plasticizing agents, crosslinking agents, additional promoters, fillers, and the like. In some embodiments, the (meth)acrylate-based pressure sensitive adhesive comprise a (meth)acrylate copolymer. Particularly suitable (meth)acrylate copolymers are ones derived from: (A) at least one monoethylenically unsaturated alkyl (meth)acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the glass transition temperature and cohesive strength of the resultant copolymer. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Generally, monomer A has a homopolymer Tg of no greater than about 0° C. Typically, the alkyl group of the (meth)acrylate has an average of about 4 to about 20 carbon atoms, or an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or -propoxylated methoxy(meth)acrylates such as acrylates of CARBOWAX (commercially available from Union Carbide) and NK ester AM90G (commercially available from Shin Nakamura Chemical, Ltd., Japan). Suitable monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the glass transition temperature and cohesive strength of the copolymer. Generally, monomer B has a homopolymer Tg of at least about 10° C. Typically, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Particularly suitable reinforcing acrylic monomers that can be used as monomer B include acrylic acid and acrylamide. Combinations of various reinforcing monoethylenically unsaturated monomers categorized as a B monomer can be used to make the copolymer.

Generally, the (meth)acrylate copolymer is formulated to have a resultant Tg of less than about 0° C. and more typically, less than about −10° C. Such (meth)acrylate copolymers generally include about 60 parts to about 98 parts per hundred of at least one monomer A and about 2 parts to about 40 parts per hundred of at least one monomer B. In some embodiments, the (meth)acrylate copolymers have about 85 parts to about 98 parts per hundred or at least one monomer A and about 2 parts to about 15 parts of at least one monomer B.

In other embodiments, the first adhesive layer comprises a siloxane gel adhesive. Siloxane gel adhesives are finding widespread use in the medical area for their desirable properties. These gel adhesives comprise a crosslinked siloxane-based matrix and a fluid contained within the matrix. In many embodiments, the fluid comprises a siloxane fluid. A wide range of siloxane gel adhesives are suitable for use as the first adhesive layer.

In some embodiments, it may be desirable for form the crosslinked polymeric siloxane matrix and then add the fluid to form the gel adhesive, in other embodiments, it may be desirable to form the crosslinked polymeric siloxane matrix in the presence of the fluid. A wide range of crosslinked polymeric siloxane matrices are suitable for use in the gel adhesive compositions. The matrices can be prepared in a variety of ways. The crosslinked polymeric siloxane matrix can be prepared by thermal curing, condensation curing, radiation curing, or a combination thereof.

A particularly suitable curing mechanism for forming the crosslinked polymeric matrix of this disclosure is actinic radiation curing. A variety of actinic radiation sources are suitable, especially UV (ultraviolet), E-beam (electron beam), and gamma ray radiation. An advantage of E-beam and gamma ray radiation is that non-functional siloxane materials are curable in this way and no initiators or catalysts are required, as described, for example, in PCT Publication Nos. WO 2010/056541 and 2010/056543 (Liu et al.). Additionally, the level of crosslinking desired can be controlled by controlling the level of E-beam or gamma ray radiation used.

Recently, gentle to skin siloxane gel adhesives have been described in US Patent Publication No. 2011/0212325 (Determan et al.) that can be prepared directly by crosslinking non-functionalized polysiloxane materials. Non-functionalized polysiloxane materials are described below. One advantage of this method of preparing siloxane gel adhesives is that a siloxane fluid can be disposed on a surface and then exposed to E-beam or gamma radiation to form the crosslinked polysiloxane matrix. The unreacted siloxane fluid remains within the crosslinked matrix. Such a process can be useful in the current multi-layer adhesive constructions as a siloxane fluid can be dispersed on the first major surface of a substrate as an adhesive precursor layer. By this it is meant that the siloxane fluid is not itself an adhesive layer, but upon curing it forms an adhesive layer. Since the multi-layer adhesive articles are exposed to actinic radiation as part of the formation process, this same actinic radiation can also effect the curing of the siloxane fluid to form the gel adhesive layer. This process is discussed in greater detail below.

A wide variety of siloxane materials are suitable to form the crosslinked siloxane matrices of this disclosure. Generally, the siloxane materials are fluids that are described by Formula 1 below:

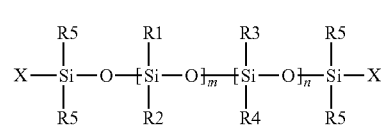

Formula 1 where R1, R2, R3, and R4 are independently selected from the group consisting of an alkyl group, an aryl group and a functional group, each R5 is an alkyl group, each X is a functional or a non-functional group, and n and m are integers, and at least one of m or n is not zero. In some embodiments, one or more of the alkyl or aryl groups may contain a halogen substituent, e.g., fluorine. For example, in some embodiments, one or more of the alkyl groups may be —$CH_2CH_2C_4F_9$. As was mentioned above, particularly suitable are non-functional polysiloxane fluids. Non-functional groups are groups that do not participate in the free radical polymerization curing reaction. As used herein a "nonfunctionalized poly diorganosiloxane material or fluid" is one in which the R1, R2, R3, R4, R5, and X groups are nonfunctional groups. Typically, the R1, R2, R3, R4, R5, and X groups are alkyl or aryl groups. Particularly important commercially available nonfunctionalized diorganosiloxane fluids are ones where the R1, R2, R3, R4, R5, and X groups are methyl groups.

Suitable nonfunctional polydiorgnanosiloxane materials include AK 60000, AK 200000, AK 300000, AK 500000, AK 1000000, EL polymer NA from Wacker Chemie AG, PMX-200 Silicone Fluids from Dow, TSF451-100M, Element14* PDMS 60k, Element14* PDMS 100k from Momentive, DMS-T25, DMS-T35, DMS-T72 from Gelest.

Like the (meth)acrylate-based pressure sensitive adhesives described above, the siloxane gel adhesives can also contain additional optional additives if desired. Suitable additives include, non-siloxane fluids, tackifying resins, plasticizing resins, and the like. In many embodiments, the siloxane gel adhesive comprises just the crosslinked polysiloxane matrix and siloxane fluid.

The adhesive articles of this disclosure also comprise a siloxane-based pressure sensitive adhesive layer comprising a siloxane-(meth)acrylate copolymer. In some embodiments, the siloxane-based pressure sensitive adhesive layer further comprises a UV initiator. The siloxane-based pressure sensitive adhesive layer may optionally include other additives such as tackifying resins, plasticizing resins, fillers, and the like. In many embodiments, the siloxane-based pressure sensitive adhesive layer comprises only the siloxane-(meth)acrylate copolymer and optionally a UV initiator.

A wide range of siloxane-(meth)acrylate copolymers are suitable. Typically, the siloxane-(meth)acrylate copolymer is the reaction product of a reaction mixture comprising at least one ethylenically unsaturated siloxane-containing macromer, at least one alkyl (meth)acrylate monomer, at least one reinforcing monomer, and an initiator. A particularly suitable method of preparing siloxane-(meth)acrylate copolymers is described in US Patent Publication No. 2011/0300296, which describes preparing the copolymers under essentially adiabatic polymerization conditions. Such polymerizations can be carried out without the use of solvent or with a minimum of solvent.

In this polymerization method, a wide variety of ethylenically unsaturated siloxane-containing monomers may be used. For example, a number of vinyl-functional siloxanes are commercially available. Particularly suitable are siloxane-containing macromers, especially ones with the general formula of Formula 2:

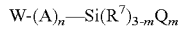

$$W\text{-}(A)_n\text{—}Si(R^7)_{3-m}Q_m \qquad \text{Formula 2}$$

where W is a vinyl group, A is a divalent linking group, n is zero or 1, m is an integer of from 1 to 3; R7 is hydrogen, lower alkyl (e.g., methyl, ethyl, or propyl), aryl (e.g., phenyl or substituted phenyl), or alkoxy, and Q is a monovalent siloxane polymeric moiety having a number average molecular weight above about 500 and is essentially unreactive under copolymerization conditions.

Such macromers are known and may be prepared by the method disclosed by Milkovich et al., as described in U.S. Pat. Nos. 3,786,116 and 3,842,059. The preparation of polydimethylsiloxane macromer and subsequent copolymerization with vinyl monomers have been described in several papers by Y. Yamashita et al., Polymer J. 14, 913 (1982); ACS Polymer Preprints 25 (1), 245 (1984); Makromol. Chem. 185, 9 (1984) and in U.S. Pat. No. 4,693,935 (Mazurek). This method of macromer preparation involves the anionic polymerization of hexamethylcyclotrisiloxane monomer to form living polymer of controlled molecular weight, and termination is achieved via chlorosilane compounds containing a polymerizable vinyl group.

The ethylenically unsaturated siloxane-containing monomer can be reacted with a wide range of (meth)acrylate monomers. (Meth)acrylate monomers are (meth)acrylate esters of non-tertiary alkyl alcohols, the alkyl groups of which comprise from about 1 to about 20, or about 1 to about 18 carbon atoms, such as those of Formula 3:

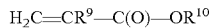

$$H_2C=CR^9\text{—}C(O)\text{—}OR^{10} \qquad \text{Formula 3}$$

wherein $R^9$ is H or $CH_3$, the latter corresponding to where the (meth)acrylate monomer is a methacrylate monomer, and $R^{10}$ is a linear, branched, aromatic, or cyclic hydrocarbon group, and —C(O)— represents a carbonyl group. When $R^{10}$ is a hydrocarbon group, it can also include heteroatoms (e.g., oxygen or sulfur).

Examples of suitable (meth)acrylate monomers useful in the present disclosure include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

The reaction mixture includes a copolymerizable reinforcing monomer. Examples of such reinforcing monomers include acid functional monomers such as acid functional (meth)acrylates, and basic functional monomers such as (meth)acrylamides, substituted (meth)acrylamides, and amine-containing (meth)acrylates.

In most embodiments, acid functional monomers are used. Useful acidic functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, typically ethylenically unsaturated carboxylic acids are used.

When acidic (meth)acrylate co-monomers are used, typically they are added in amounts ranging from about 2% by weight to about 30% by weight, or about 2% by weight to about 15% by weight, relative to the total monomer content. Generally, as the proportion of acidic monomers used in preparing the acidic copolymer increases, cohesive strength of the resulting polymer increases.

The reaction mixture also comprises at least one thermal initiator. Thermal initiators are species which generate free radicals upon heating. Many possible thermal free radical initiators are known in the art of vinyl monomer polymerization and may be used. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the VAZO compounds manufactured by DuPont, such as VAZO 52 (2,2'-azobis(2,4-dimethylpentanenitrile)), VAZO 64 (2,2'-azobis(2-methylpropanenitrile)), VAZO 67 (2,2'-azobis(2-methylbutanenitrile)), and VAZO 88 (2,2'-azobis(cyclohexanecarbonitrile)). Additional commercially available thermal initiators include, for example, LUPERSOL 130 (2,5-dimethyl-2,5-Di-(t-butylperoxy) hexyne-3) available from Elf Atochem, Philadelphia, PA, and LUPEROX 101 (2,5-dimethyl-2,5-di-(tert-butylperoxoxy) hexane) available from Arkema Canada, Inc., Oakville. In US Patent Publication No. 2011/0300296, the polymerization process is described in detail and in some embodiments includes a mixture of initiators.

As mentioned above, in some embodiments the siloxane-based pressure sensitive adhesive also includes at least one UV initiator. This initiator is present such that upon exposure to actinic radiation in the UV, crosslinking is initiated. As described above, it is believed that this crosslinking aids in forming strong interlayer adhesion and helps to prevent weak boundary layers from forming between the first adhesive layer and siloxane-based pressure sensitive adhesive layer.

A wide range of UV initiators are suitable. Examples of suitable UV photoinitiators include DAROCURE 4265, IRGACURE 184, IRGACURE 651, IRGACURE 1173, IRGACURE 819, LUCIRIN TPO, LUCIRIN TPO-L, commercially available from BASF, Charlotte, NC. Generally, if present, the UV initiator is used in amounts of 0.01 to 1 parts by weight, more typically 0.1 to 0.5, parts by weight relative to 100 parts by weight of the siloxane-based pressure sensitive adhesive layer.

The adhesive articles of this disclosure can have a wide range of thicknesses. In some embodiments, the adhesive construction has a thickness of from 25-100 micrometers, where the thickness of the siloxane-based pressure sensitive adhesive layer comprises 25% or less of the total thickness of the first adhesive layer.

As described above, the siloxane-based pressure sensitive adhesive layer can be a continuous or a discontinuous layer. In embodiments in which the siloxane-based pressure sensitive adhesive is a discontinuous layer, the areas where the siloxane-based pressure sensitive adhesive is present on the surface of the first adhesive layer can be arranged in a regular or irregular manner.

Also, the siloxane-based pressure sensitive adhesive layer can be a patterned layer. By a patterned layer it is meant that the layer, whether continuous or discontinuous, is a structured layer and can have a microstructured pattern on its surface. This pattern is in contrast to embodiments in which the siloxane-based pressure sensitive adhesive is essentially flat, having no structural features other than the natural surface roughness inherent to the layer. Typically, the structured surface in the siloxane-based pressure sensitive adhesive layer is formed by contacting a structuring tool to the adhesive surface. In many embodiments, the structuring tool is a structured release liner, that is to say a releasing substrate that contains a structured surface. A wide variety of patterns and shapes can be present in the surface of the structured surface of the release liner. The structures may have a wide variety of shapes and sizes. In general the structures are microstructures, meaning that they are microstructural features with at least 2 dimensions of the structures of microscopic size. The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended.

Typically, the height of the microstructured features on the release liners above the base of the release liner surface is less than or equal to the thickness of the pressure sensitive adhesive layer.

In addition to the first substrate, the adhesive articles can also comprise a second substrate. The second substrate is in contact with the first major surface of the siloxane-based pressure sensitive adhesive layer. Suitable second substrates include the substrates described above for the first substrate. In some embodiments, the second substrate can be a release liner to protect the surface of the adhesive article until it is to be used. The release liner can be a structured release liner that imparts a pattern of structures into the surface of the siloxane-based pressure sensitive adhesive layer.

In other embodiments, the first substrate is a release liner and the second substrate is a polymeric film, a fabric, a non-woven, a foam, a paper, a mesh, or an adhesive. In these embodiments, the siloxane-based pressure sensitive adhesive, instead of acting as a surface modifying agent for the first adhesive layer is acting as a primer layer or tie layer between the first adhesive layer and the second substrate. In embodiments where the second substrate is a tape backing type of material such as a film, fabric or foam, the siloxane-based pressure sensitive adhesive can act as a primer layer to increase the adhesion between the first adhesive layer and the second substrates. This can be particularly important in cases where the first adhesive layer is siloxane gel adhesive that may have low adhesion to these types of substrates. In the absence of the primer layer, attempts to remove the adhesive article can instead result in article coming apart. Additionally, if the second substrate is an adhesive layer, the interlayer adhesion between the first adhesive layer and adhesive substrate layer may be weak, and therefore the presence of the siloxane-based pressure sensitive adhesive layer as a tie layer can strengthen the adhesion between the first adhesive layer and the substrate adhesive layer.

This disclosure also includes a second class of embodiments of adhesive articles, where the adhesive articles utilize physical properties to control the adhesive properties of the articles. In these embodiments, the adhesive article comprises a first substrate comprising a first major surface and a second major surface, and a multi-layered adhesive disposed on the substrate. In some embodiments, the multi-layered adhesive comprises a continuous layer of a first adhesive with a first major surface and a second major surface, where the second major surface of the first adhesive is in contact with the first major surface of the first substrate, and a discontinuous second layer of adhesive, wherein the second layer of adhesive has a first major surface and a second major surface, wherein the second major surface of the second adhesive layer is in contact with the first major surface of the first adhesive. In these embodiments, the thickness of the first adhesive layer is less than the thickness of the second adhesive layer, and wherein the first adhesive and the second adhesive comprise different pressure sensitive adhesives.

In many embodiments, the discontinuous layer of second adhesive comprises a patterned layer. Examples of suitable patterns include a repeating or random series of voids in the second adhesive pattern. These voids extend through the thickness of the second adhesive layer such that the underlying first adhesive layer is exposed in the void locations. Typically, the voids have relatively small diameters, and are of the type used in medical adhesive layers to provide moisture vapor transmission. As was mentioned above, while not wishing to be bound by theory, it is believed that the underlying first adhesive layer provides a secondary adhesion mechanism for the adhesive article, a second adhesion mechanism that is weaker than the primary adhesion mechanism of the second layer of adhesive. This weaker, secondary adhesion mechanism provides increased adhesion to the target substrate without increasing skin damage.

In some embodiments, the first adhesive comprises a (meth)acrylate-based pressure sensitive adhesive. Examples of (meth)acrylate-based pressure sensitive adhesives are those that comprise a (meth)acrylate co-polymer of at least one alkyl (meth)acrylate monomer and at least one reinforcing monomer. A wide range of (meth)acrylate-based pressure sensitive adhesives have been described above. These (meth)acrylate-based pressure sensitive adhesives are suitable for use as the first adhesive layer.

The adhesive article also includes a second pressure sensitive adhesive layer. This adhesive layer may also comprise a (meth)acrylate-based pressure sensitive adhesive layer. Examples of (meth)acrylate-based pressure sensitive adhesives are those that comprise a (meth)acrylate co-polymer of at least one alkyl (meth)acrylate monomer and at least one reinforcing monomer. A wide range of (meth)acrylate-based pressure sensitive adhesives have been described above. These (meth)acrylate-based pressure sensitive adhesives are suitable for use as the first adhesive layer.

Typically, the multi-layer adhesive has a thickness of from 25-100 micrometers, wherein the thickness of the first adhesive layer comprises 25% or less of the total thickness of the adhesive layer.

As with the adhesive articles described above, a wide range of substrates are suitable including polymeric films, fabrics, non-wovens, foams, papers, meshes, adhesives, or release liners.

Unlike the first class of embodiments of adhesive articles, typically the second class of adhesive articles relies on the physical modification of the second adhesive, that is to say the discontinuity of the second adhesive, to modify the adhesive properties of the adhesive article. While the first and second adhesive layers generally are different pressure sensitive adhesive compositions, typically they are both (meth)acrylate-based pressure sensitive adhesives. The similarity between the two pressure sensitive adhesive layers permits a great deal of interaction at the interface between these adhesives and helps to eliminate problems of low interfacial adhesion.

Also disclosed herein are methods for preparing adhesive articles. In some embodiments, the method comprises providing a first substrate with a first major surface and a second major surface, forming a multi-layer adhesive construction on the first major surface of the first substrate, and exposing the formed adhesive construction to actinic radiation. Forming the multi-layer adhesive construction comprises providing a first adhesive composition or a first pre-adhesive composition, disposing the first adhesive or pre-adhesive composition on at least a portion of the first major surface of the first substrate to form a first adhesive or pre-adhesive layer with a first major surface and a second major surface. The second major surface of the first adhesive or pre-adhesive layer is in contact with the first major surface of the first substrate. A siloxane-based pressure sensitive adhesive composition is then disposed on the first major surface of the first adhesive or pre-adhesive layer to form a siloxane-based pressure sensitive adhesive layer with a first major surface and a second major surface, wherein the second major surface of the siloxane-based pressure sensitive adhesive layer is in contact with the first major surface of the first adhesive or pre-adhesive layer. The thickness of the siloxane-based pressure sensitive adhesive layer is thinner than the thickness of the first adhesive or pre-adhesive layer. The pre-adhesive composition is a composition that upon curing forms an adhesive composition.

Each of these compositions has been described in detail above. Suitable substrates have been described above in detail and include a polymeric film, a fabric, a non-woven, a foam, a paper, a mesh, an adhesive, or a release liner.

In some embodiments, the first adhesive composition comprises a (meth)acrylate-based pressure sensitive adhesive or a siloxane gel adhesive. The first adhesive composition may also include optional additives as are described above.

In some embodiments, a siloxane fluid can be used as a pre-adhesive composition, such that upon curing it forms a siloxane gel adhesive as the first adhesive layer. In this way, the siloxane fluid is a siloxane gel adhesive pre-adhesive composition. Exposure of this pre-adhesive composition to actinic radiation in the form of electron beam radiation or gamma radiation crosslinks a portion of the fluid to form the crosslinked siloxane matrix of the siloxane gel adhesive. The exposure of pre-adhesive composition to actinic radiation can be carried out prior to the disposing of the siloxane-based pressure sensitive adhesive layer on the first adhesive layer. However, since the multi-layer adhesive construction is exposed to actinic radiation after it is formed, it can be useful to use this step to cure the pre-adhesive composition. In this way, the pre-adhesive composition and the siloxane-based pressure sensitive adhesive layer are curing at the same time and while in contact. This simultaneous curing can help to improve interlayer adhesion between the first adhesive layer and the siloxane-based pressure sensitive adhesive layer.

The siloxane-based pressure sensitive adhesive composition comprises a siloxane-(meth)acrylate co-polymer, and may contain additional additives. In some embodiments, the siloxane-based pressure sensitive adhesive layer further comprises a UV initiator, and exposure to actinic radiation comprises exposure to UV radiation. In other embodiments, no UV initiator is present and exposure to actinic radiation comprises exposure to electron beam radiation or gamma radiation.

The first adhesive or pre-adhesive composition can be disposed on the first substrate in a variety of different ways. Typically, the composition is coated onto the first substrate. A wide variety of coating methods are suitable such as knife coating, roll coating, gravure coating, rod coating, curtain coating, and air knife coating. The composition mixture may also be printed by known methods such as screen printing or inkjet printing.

The siloxane-based pressure sensitive adhesive can likewise be disposed on the first adhesive layer using any suitable method. The siloxane-based pressure sensitive adhesive layer can be continuous or discontinuous. If the siloxane-based pressure sensitive adhesive layer is discontinuous, printing techniques are particularly suitable. Additionally, the siloxane-based pressure sensitive adhesive layer, whether continuous or discontinuous, can be patterned. This patterning imparts a structured surface, typically a microstructured surface, to the siloxane-based pressure sensitive adhesive layer. The structured surface can be imparted by contacting the siloxane-based pressure sensitive adhesive layer to a microstructured tool, such as a microstructured release liner.

The adhesive constructions can have a wide range of thicknesses. Typically, the adhesive construction has a thickness of from 25-100 micrometers, where the thickness of the siloxane-based pressure sensitive adhesive layer comprises 25% or less of the total thickness of the adhesive layer.

The adhesive construction is exposed to actinic radiation, that is to say UV, E-beam or gamma ray radiation. If UV radiation is used, an appropriate initiator is present in the siloxane-based pressure sensitive adhesive layer. The UV radiation activates the initiator to form a free radical, this radical abstracts a hydrogen from the siloxane-(meth)acrylate copolymer of the siloxane-based pressure sensitive adhesive layer, which causes crosslinking to occur. When E-beam or gamma ray radiation is used, no initiator is needed. As was mentioned above, if a siloxane fluid is used as the pre-adhesive composition of the first adhesive layer, typically E-beam or gamma radiation is used and the exposure of the adhesive construction to the actinic radiation cures the pre-adhesive composition to form the gel adhesive layer as well carrying out the crosslinking of the siloxane-based pressure sensitive adhesive layer.

A variety of procedures for E-beam and gamma ray curing are well-known. The cure depends on the specific equipment used, and those skilled in the art can define a dose calibration model for the specific equipment, geometry, and line speed, as well as other well understood process parameters.

Commercially available electron beam generating equipment is readily available. For the examples described herein, the radiation processing was performed on a Model CB-300 electron beam generating apparatus (available from Energy Sciences, Inc. (Wilmington, MA). Generally, a support film (e.g., polyester terephthalate support film) runs through a chamber. Generally, the chamber is inerted (e.g., the oxygen-containing room air is replaced with an inert gas, e.g., nitrogen) while the samples are e-beam cured.

Commercially available gamma irradiation equipment includes equipment often used for gamma irradiation sterilization of products for medical applications. In some embodiments, such equipment may be used to cure, or partially cure the gentle to skin adhesives of the present disclosure. In some embodiments, such curing may occur simultaneously with a sterilization process for a semi-finished or finished product, for example a tape or wound dressing.

If UV radiation is used, a wide variety of UV lamps are suitable. Examples include mercury vapor lamps, UV fluorescent lamps, and UV LEDs.

Additional adhesive articles can be prepared by providing a second substrate with a first major surface and a second major surface, and contacting the second major substrate of the second substrate to the first major surface of the siloxane-based pressure sensitive adhesive layer of the adhesive construction. The second substrate can be contacted to the siloxane-based pressure sensitive adhesive layer either prior to exposure to actinic radiation or after the adhesive construction has been exposed to actinic radiation. Typically, the second substrate is contacted to the siloxane-based pressure sensitive adhesive layer prior to the exposure to actinic radiation.

Similar methods can be used to form the second class of embodiments of adhesive articles. In these embodiments, a thin layer of first pressure sensitive adhesive is disposed on the second major surface of the first substrate. Typically, this first pressure sensitive adhesive comprises a (meth)acrylate-based pressure sensitive adhesive. As mentioned above, this layer is typically 25% or less of the total thickness of the multi-layer adhesive, and thus is typically 25 micrometers or thinner, generally considerably thinner.

The second, discontinuous layer of pressure sensitive adhesive is disposed on the continuous layer of first pressure sensitive adhesive. While the discontinuous layer of pressure sensitive adhesive can be applied directly to the first pressure sensitive adhesive layer, in many embodiments it may be desirable to prepare the second discontinuous layer separately and laminate this layer to the first pressure sensitive adhesive. In some embodiments, the discontinuous second pressure sensitive adhesive layer can be prepared by coating the second pressure sensitive adhesive onto a structured release liner, where the structures of the release liner are sufficiently large to form a pattern of voids in the adhesive layer where the voids extend through the entire thickness of the adhesive layer. The coating onto a structured release liner can be effected in a wide variety of ways. In some embodiments, the adhesive is hot melt coated onto the structured liner as a 100% solids composition and allowed to cool to room temperature to form the structured pressure sensitive adhesive layer. In other embodiments, a solution or dispersion of adhesive can be coated onto the structured liner and allowed to dry, either at room temperature or elevated temperature, to form the structured pressure sensitive adhesive layer. In other embodiments, a curable pre-adhesive composition is coated onto the structure release liner and cured to form the structured pressure sensitive adhesive layer. However the structured pressure sensitive adhesive layer is formed, it is contacted to the first pressure sensitive adhesive layer and the release liner is removed to form the adhesive article.

The disclosure is further illustrated by the Figures which illustrate various embodiments of the adhesive articles described above. FIGS. 1-6 show article of the first class of embodiments and FIG. 7 shows an article of the second class of embodiments.

FIG. 1 shows a cross-sectional view of article 100 with substrate 110, first adhesive layer 120, and second adhesive layer 130, where second adhesive layer comprises a siloxane-based pressure sensitive adhesive as described above.

Figure 2:
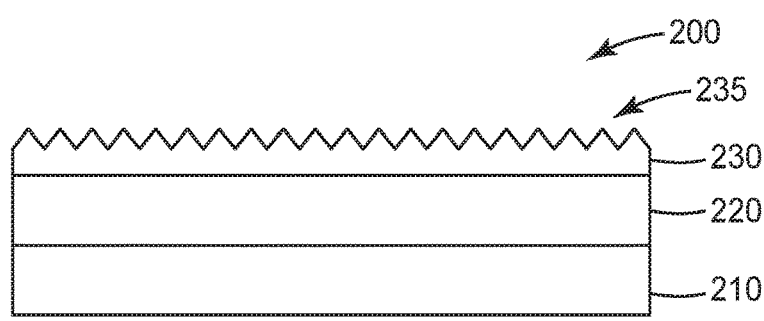
FIG. 2 shows a cross-sectional view of an embodiment of another article of this disclosure.

FIG. 2 shows a cross-sectional view of article 200 with substrate 210, first adhesive layer 220, and second siloxane-based adhesive layer 230. The second pressure sensitive adhesive layer 230 has a microstructured surface 235.

Figure 3:
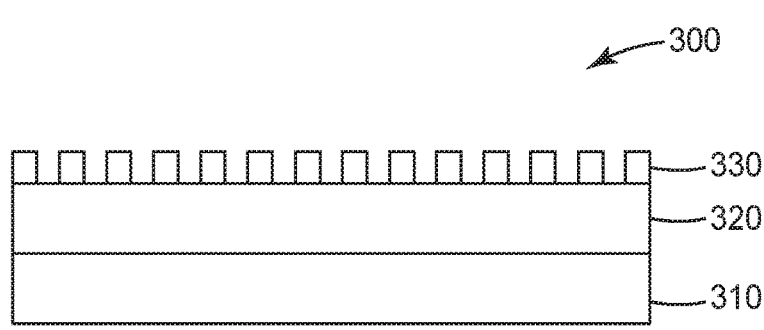
FIG. 3 shows a cross-sectional view of an embodiment of another article of this disclosure.

FIG. 3 shows a cross-sectional view of article 300 with substrate 310, first adhesive layer 320, and discontinuous adhesive layer 330, where discontinuous adhesive layer 330 comprises a siloxane-based pressure sensitive adhesive as described above.

Figure 4:
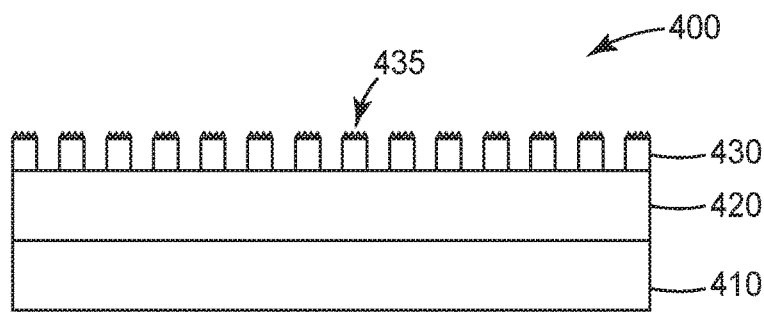
FIG. 4 shows a cross-sectional view of an embodiment of another article of this disclosure.

FIG. 4 shows a cross-sectional view of article 400 with substrate 410, first adhesive layer 420, and discontinuous siloxane-based adhesive layer 430. The surface of the discontinuous second pressure sensitive adhesive 430 has a microstructured surface 435.

Figure 5:
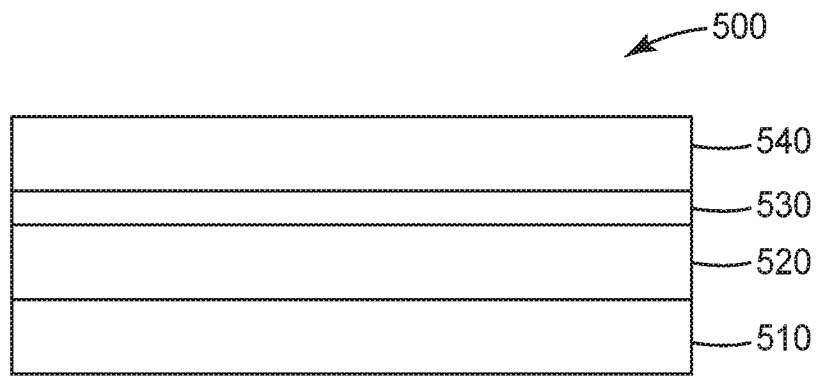
FIG. 5 shows a cross-sectional view of an embodiment of another article of this disclosure.

FIG. 5 shows a cross-sectional view of article 500 with substrate 510, first adhesive layer 520, second adhesive layer 530, and second substrate 540. Second substrate 540 is a continuous substrate such as a release liner.

Figure 6:
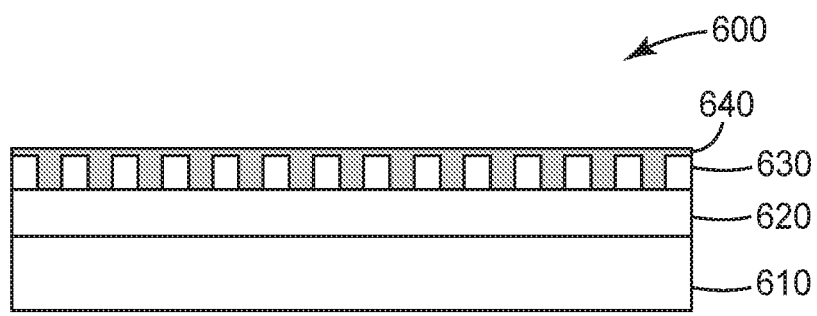
FIG. 6 shows a cross-sectional view of an embodiment of another article of this disclosure.
Figure 7:
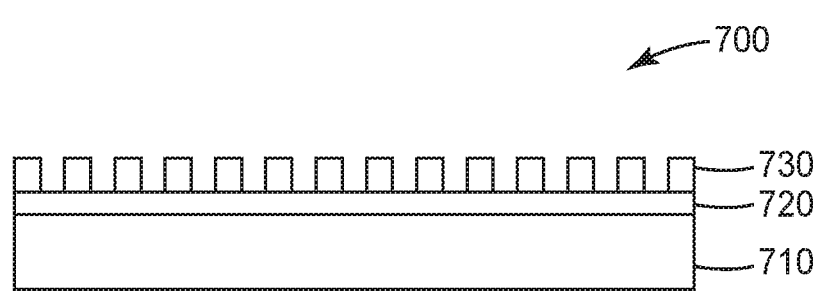
FIG. 7 shows a cross-sectional view of an embodiment of the second class of articles of this disclosure.

FIG. 6 shows a cross-sectional view of article 600 with substrate 610, first adhesive layer 620, discontinuous second adhesive layer 630, and second substrate 640. Second substrate 640 is an adhesive layer that seeps into the spaces in discontinuous layer 630. The adhesive layer 640 is shown as completely covering the discontinuous adhesive layer 630, but in some embodiments, the adhesive layer 640 is also discontinuous, being located essentially only in the spaces in the discontinuous adhesive layer 630.

FIG. 7 shows a cross-sectional view of article 700 with substrate 710, first adhesive layer 720, and discontinuous second adhesive layer 730, where the first and second adhesive layers are (meth)acrylate-based pressure sensitive adhesives as described above.

The disclosure includes the following embodiments:

Among the embodiments are adhesive articles. Embodiment 1 includes an adhesive article comprising: a first substrate comprising a first major surface and a second major surface; and a multi-layered adhesive comprising: a layer of a first adhesive with a first major surface and a second major surface, wherein the second major surface of the first adhesive is in contact with the first major surface of the first substrate; and a layer of siloxane-based pressure sensitive adhesive with a first major surface and a second major surface, comprising a siloxane-(meth)acrylate co-polymer, wherein the second major surface of the siloxane-based pressure sensitive adhesive is in contact with the first major surface of the first adhesive, wherein the thickness of the siloxane-based pressure sensitive adhesive layer is less than the thickness of the first adhesive layer.

Embodiment 2 is adhesive article of embodiment 1, wherein the siloxane-based pressure sensitive adhesive further comprises a UV initiator, and wherein the multi-layered adhesive has been exposed to UV radiation.

Embodiment 3 is the adhesive article of embodiment 1 or 2, wherein the first substrate comprises a polymeric film, a fabric, a non-woven, a foam, a paper, a mesh, an adhesive, or a release liner.

Embodiment 4 is the adhesive article of any of embodiments 1-3, wherein the first adhesive comprises a (meth) acrylate-based pressure sensitive adhesive or a siloxane gel adhesive.

Embodiment 5 is the adhesive article of embodiment 4, wherein the first adhesive comprises a (meth)acrylate-based pressure sensitive adhesive comprising a (meth)acrylate co-polymer of at least one alkyl (meth)acrylate monomer and at least one reinforcing monomer.

Embodiment 6 is the adhesive article of any of embodiments 1-5, wherein the reinforcing monomer is selected from an acid-functional acrylate monomer or a base-functional acrylate monomer.

Embodiment 7 is the adhesive article of any of embodiments 1-6, wherein the siloxane-(meth)acrylate copolymer comprises the reaction product of a reaction mixture comprising: at least one ethylenically unsaturated siloxane-containing macromer; at least one alkyl (meth)acrylate monomer; and at least one reinforcing monomer.

Embodiment 8 is the adhesive article of embodiment 7, wherein the reinforcing monomer is selected from an acid-functional acrylate monomer or a base-functional acrylate monomer.

Embodiment 9 is the adhesive article of any of embodiments 1-8, wherein the adhesive layer has a thickness of from 25-100 micrometers, wherein the thickness of the siloxane-based pressure sensitive adhesive layer comprises 25% or less of the total thickness of the adhesive layer.

Embodiment 10 is the adhesive article of any of embodiments 1-9, wherein the siloxane-based pressure sensitive adhesive layer comprises a discontinuous layer.

Embodiment 11 is the adhesive article of any of embodiments 1-10, wherein the siloxane-based pressure sensitive adhesive layer comprises a patterned layer.

Embodiment 12 is the adhesive article of any of embodiments 1-11, further comprising a second substrate, wherein the second substrate is in contact with the first major surface of the siloxane-based pressure sensitive adhesive.

Embodiment 13 is the adhesive article of embodiment 12, wherein the second substrate comprises a release liner and the first substrate comprises a polymeric film, a fabric, a non-woven, a foam, a paper, a mesh, an adhesive, or a release liner.

Embodiment 14 is an adhesive article comprising: a first substrate comprising a first major surface and a second major surface; and a multi-layered adhesive comprising: a continuous layer of a first adhesive with a first major surface and a second major surface, wherein the second major surface of the first adhesive is in contact with the first major surface of the first substrate; and a discontinuous second layer of adhesive, wherein the second layer of adhesive has a first major surface and a second major surface, wherein the second major surface of the second adhesive layer is in contact with the first major surface of the first adhesive, wherein the thickness of the first adhesive layer is less than the thickness of the second adhesive layer, and wherein the first adhesive and the second adhesive comprise different pressure sensitive adhesives.

Embodiment 15 is the adhesive article of embodiment 14, wherein the discontinuous layer of second adhesive comprises a patterned layer.

Embodiment 16 is the adhesive article of embodiment 14 or 15, wherein the first adhesive comprises a (meth)acrylate-based pressure sensitive adhesive.

Embodiment 17 is the adhesive article of embodiment 16, wherein the first adhesive comprises a (meth)acrylate-based pressure sensitive adhesive comprising a (meth)acrylate co-polymer of at least one alkyl (meth)acrylate monomer and at least one reinforcing monomer.

Embodiment 18 is the adhesive article of any of embodiments 14-17, wherein the second adhesive comprises a (meth)acrylate-based pressure sensitive adhesive that is different from the first adhesive composition.

Embodiment 19 is the adhesive article of any of embodiments 14-18, wherein the adhesive layer has a thickness of from 25-100 micrometers, wherein the thickness of the first adhesive layer comprises 25% or less of the total thickness of the adhesive layer.

Embodiment 20 is the adhesive article of any of embodiments 14-19, wherein the first substrate comprises a polymeric film, a fabric, a non-woven, a foam, a paper, a mesh, an adhesive, or a release liner.

Also disclosed are methods of preparing adhesive articles. Embodiment 21 includes the method of preparing an adhesive article comprising: providing a first substrate with a first major surface and a second major surface; forming a multi-layer adhesive construction on the first major surface of the first substrate, wherein forming the multi-layer adhesive construction comprises: providing a first adhesive composition or a first pre-adhesive composition, wherein the pre-adhesive composition, upon curing forms an adhesive composition; disposing the first adhesive or pre-adhesive composition on at least a portion of the first major surface of the first substrate to form a first adhesive or pre-adhesive layer with a first major surface and a second major surface, wherein the second major surface of the first adhesive or pre-adhesive layer is in contact with the first major surface of the first substrate; disposing a siloxane-based pressure sensitive adhesive composition comprising a siloxane-(meth)acrylate co-polymer on the first major surface of the first adhesive or pre-adhesive layer to form a siloxane-based pressure sensitive adhesive layer with a first major surface and a second major surface, wherein the second major surface of the siloxane-based pressure sensitive adhesive layer is in contact with the first major surface of the first adhesive or pre-adhesive layer, wherein the thickness of the siloxane-based pressure sensitive adhesive layer is thinner than the thickness of the first adhesive or pre-adhesive layer; and exposing the formed adhesive construction to radiation.

Embodiment 22 is the method of embodiment 21, wherein the siloxane-based pressure sensitive adhesive layer further comprises a UV initiator, and exposure to radiation comprises exposure to UV radiation.

Embodiment 23 is the method of embodiment 21 or 22, wherein the first substrate comprises a polymeric film, a fabric, a non-woven, a foam, a paper, a mesh, an adhesive, or a release liner.

Embodiment 24 is method of any of embodiments 21-23, wherein the first adhesive or pre-adhesive layer comprises a (meth)acrylate-based pressure sensitive adhesive layer or a siloxane gel pre-adhesive layer.

Embodiment 25 is the method of embodiment 24, wherein the first adhesive or pre-adhesive layer comprises a (meth) acrylate co-polymer of at least one alkyl (meth)acrylate monomer and at least one reinforcing monomer.

Embodiment 26 is the method of embodiment 24, wherein the first adhesive or pre-adhesive layer comprises a siloxane gel pre-adhesive layer comprising a siloxane fluid, and wherein exposure to radiation comprises exposure to electron beam or gamma radiation.

Embodiment 27 is the method of any of embodiment 21-26, wherein the siloxane-(meth)acrylate copolymer comprises the reaction product of a reaction mixture comprising: at least one ethylenically unsaturated siloxane-containing macromer; at least one alkyl (meth)acrylate monomer; and at least one reinforcing monomer.

Embodiment 28 is the method of embodiment 27, wherein the reinforcing monomer is selected from an acid-functional acrylate monomer or a base-functional acrylate monomer.

Embodiment 29 is the method of any of embodiment 21-28, wherein the adhesive layer has a thickness of from 25-100 micrometers, wherein the thickness of the siloxane-based pressure sensitive adhesive layer comprises 25% or less of the total thickness of the adhesive layer.

Embodiment 30 is the method of any of embodiment 21-29, wherein the siloxane-based pressure sensitive adhesive layer comprises a discontinuous layer.

Embodiment 31 is the method of embodiment 30, wherein the discontinuous siloxane-based pressure sensitive adhesive layer is formed by pattern coating.

Embodiment 32 is the method of any of embodiment 21-31 further comprising: providing a second substrate with a first major surface and a second major surface; and contacting the second major substrate of the second substrate to the first major surface of the siloxane-based pressure sensitive adhesive layer of the adhesive construction prior to exposure to radiation.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; St Louis, MO unless otherwise noted. The following abbreviations are used: cm=centimeters; in=inch; kg=kilograms; Pa=Pascals; min=minutes. The terms "weight %", "% by weight", and "wt %" are used interchangeably.

TABLE 1

Table of Abbreviations for Materials

| Abbreviation | Description |
| --- | --- |
| D3 | Hexamethyltrisiloxane |
| BuLi | n-Butyl lithium (1.7M in hexane) |
| THF | Tetrahydrofuran |
| IOA | Isooctyl acrylate |
| AAm | Acrylamide |
| AA | Acrylic acid |
| EHA | 2-ethyl hexyl acrylate |
| BA | Butyl acrylate |
| EA | Ethyl acetate |
| SiMac | A methacrylate-terminated polydimethylsiloxane macromer prepared as described in the Synthesis Examples Below |
| Initiator-1 | 2-2'-Azobis(2,4-dimethylvaleronitrile) commercially available as "VAZO 52". |
| IOTG | Isooctylthioglycoate chain transfer agent |
| ABP | 4-Acryloxybenzophenone, prepared according to U.S. Pat. No. 4,737,559 (Kellen et al.) |
| Backing 1 | Cloth - Cellulose Acetate Taffeta, 180 × 42, 75 d warp, 150 d Fill, with LAB coating, DURAPORE 1538 tape backing, manufactured by 3M Company, St. Paul, MN |
| Tape 1 | DURAPORE 1538 tape with a 1 inch (2.5 cm) width, manufactured by 3M Company, St. Paul, MN |

TABLE 1-continued

Table of Abbreviations for Materials

| Abbreviation | Description |
| --- | --- |
| Tape 2 | KIND REMOVAL SILICONE TAPE 2770 with a 1 inch (2.5 cm) width, manufactured by 3M Company, St. Paul, MN |
| Tape 3 | MULTIPORE DRY SURGICAL TAPE 3730-1 with a 1 inch (2.5 cm) width, manufactured by 3M Company, St. Paul, MN |
| Tape 4 | TRANSPORE WHITE SURGICAL TAPE with a 1 inch (2.5 cm) width, manufactured by 3M Company, St. Paul, MN |
| Tape 5 | MICROPORE tape with a 1 inch (2.5 cm) width, manufactured by 3M Company, St. Paul, MN |
| PSA-1 | A crosslinkable (meth)acrylate PSA of EHA/BA/AA/ABP, prepared as described in U.S. Pat. No. 5,637,646 (Ellis). |
| PSA-2 | A hot melt processable (meth)acrylate PSA of IOA/AA approximately 96/4 monomer content prepared as described in U.S. Pat. No. 6,294,249 (Hamer et al.). |
| PSA-3 | SiMac/AAm PSA prepared according to Preparation Example PE-1 below |
| PSA-4 | SiMAc/AA PSA prepared according to Preparation Example PE-2 below |
| PSA-5 | A tackified, crosslinkable, hot melt processable (meth)acrylate PSA of 95 wt % (meth)acrylate polymer (EHA/AA/ABP approximately 96.5/3.5/0.05 monomer content), and 5 wt % tackifying resin ("AVALURE AC 210" commercially available from Lubrizol) prepared as described in U.S. Pat. No. 6,294,249 (Hamer et al.). |

Synthesis Examples
Preparation of SiMac

A methacrylate-terminated polydimethylsiloxane macromer (SiMac) was prepared as described in U.S. Pat. No. 4,693,935 (Mazurek) "Monomer C3b". A flame-dried 1-liter three-necked flask equipped with a mechanical stirrer, condenser, and septum and purged with dry argon was charged with a dilute solution of D3 (1 gram) in heptane (100 milliliters), both freshly dried. 5.5 milliliters of BuLi solution (1.7 M in hexane, 9.35 mmoles) was introduced and the initiation reaction was continued overnight at room temperature. 198.7 grams (0.89 mole) of D3 in THF (496.8 g) was added to the reaction flask via polytetrafluoroethylene (PTFE) tubing and the polymerization was continued for 8 hours with the reaction mixture maintained at room temperature. Progress of the reaction was monitored by GC analysis of the reaction mixture. The capping agent, 3-methacryloxypropyldimethylchlorosilane (2.26 g, 10.3 mmoles) was then introduced and the reaction mixture was stirred for 1 hour, while additionally agitated with an ultrasonic bath which raised the temperature to about 40° C. The resultant polymer solution was poured into an excess of methanol with vigorous stirring. The separated polymer fraction was dissolved in ethyl ether and washed with water. The organic layer was dried with magnesium sulfate, filtered, and evaporated. The resultant polymer did not contain detectable quantities of low molecular weight materials, such as oligomeric siloxanes.

Preparatory Examples PE-1 and PE-2

Preparatory Examples PE-1 and PE-2 were prepared using the method provided for Examples 1-4 in US Patent Publication No. 2011/0300296. Polymerizations were carried out by a two-step reaction within a VSP2 adiabatic reaction apparatus equipped with a 316 stainless steel test can (available from Fauske and Associates Inc, Burr Ridge Ill.). In the VSP2 reaction vessel was placed IOA, AA or AAm, the SiMac macromonomer prepared above, and ABP in the amounts shown in Table 2. The polymerization mixture also included Initiator-1 (VAZO 52), and chain transfer agent (IOTG) and the polymerization was carried out as described in Examples 1–4 of US Patent Publication No. 2011/0300296.

TABLE 2

Reagents used in first step of Preparatory Examples (parts by weight).

| | IOA | AAm | AA | SiMac | ABP |
|---|---|---|---|---|---|
| Preparatory Example PE-1 | 89.5 | 3.0 | — | 7.5 | 0.3125 |
| Preparatory Example PE-2 | 89.5 | — | 3.0 | 7.5 | 0.3125 |

The Preparatory Examples were removed from the reactor and dissolved in THF at approximately 30% solids. The polymeric reaction product yielded a clear solid PSA that was cold flowing until it was crosslinked.

Test Methods

PSA coating weight Determination

The weight of a 24 in$^2$ sample (4 in by 6 in or 10 cm×15 cm) of uncoated film substrate was subtracted from the weight of a 24 in$^2$ sample of PSA-coated film substrate and reported as the weight of the PSA coating in grains per 24 in$^2$.

Adhesion to Wet PVC

PSA tape samples were cut to 1 inch (2.54 cm) width and rolled onto PVC (polyvinyl chloride) test substrates using a 4.5 lb hand roller. The sample and substrate were submerged completely beneath room temperature water and maintained in the water for five minutes. After five minutes, the samples were removed from the water and lightly dried with a paper towel to remove excess water.

Peel adhesion strength generally followed the procedure described in ASTM D 3330-90. Peel adhesion strength was measured at 72° F. (22° C.) and 50% relative humidity (RH) using a Zwick model Z005 tensile tester (Zwick USA, Kennesaw, GA). For initial (0 hour dwell, reported as T0) testing, the samples were immediately placed into the peel test machine and tested at 180° and 12 inches per minute (30 cm/min). For 24 hour and 72 hour dwell testing (reported as T24 and T72, respectively), the samples were left in a constant temperature and humidity area at 72° F. (22° C.) and 52% relative humidity (RH) prior to testing on the same mechanical peel tester and in the same manner. The force to remove the PSA tape sample from the substrate is reported in ounces per inch width. Five samples were tested and the recorded values were averaged to provide the reported Peel to Wet PVC value.

Adhesion to Dry and Wet Skin

Evaluation of the adhesion of a composition to human skin is an inherently variable determination. Human skin possesses wide variations in composition, topography and adhesion can be affected by the presence or absence of various body fluids. However, comparative average values of tape or dressing adhesion are attainable by using test results from several individuals as described herein.

Initial skin adhesion (T0) to dry or wet skin and skin adhesion at 24 hours (T24) and 48 hours (T48) were measured in accordance with the widely accepted PSTC-I Peel Adhesion Test, a testing protocol established by the Specifications and Technical Committee of the Pressure-Sensitive Tape Council located at 5700 Old Orchard Road, Skokie, IL. The test was modified for the purposes of this disclosure by applying the dressing sample to the skin of a living human.

Three samples (one for T0, wet-skin testing, one for T0, dry-skin testing, and one for T24 or T48, dry skin testing), each measuring 2.5-cm wide by 7.6-cm long, were applied to the back of each of one to eight human subjects. The subjects were placed in a prone position with arms at their sides and heads turned to one side. Samples were applied without tension or pulling of skin to both sides of the spinal column with the length of each sample positioned at a right angle to the spinal column.

Those samples tested for wet skin adhesion were applied to skin which had been moistened with a water saturated cloth (leaving visually observable drops of standing water) immediately before application of the sample.

The samples were pressed into place with a 2-kg roller moved at a rate of approximately 2.5 cm/sec with a single forward and reverse pass. No manual pressure was applied to the roller during application.

The samples were then removed about 2-5 minutes after application (T0) at a removal angle of 180° and at a removal rate of 15 centimeters per minute (cm/min) using a conventional adhesion tester equipped with a 11.3 kg test line attached to a 2.5 cm clip.

The clip was attached to the edge of the sample furthest from the spinal column by manually lifting about 1 cm of the sample from the skin and attaching the clip to the raised edge. The adhesion tester was a strain-gauge mounted on a motor-driven carriage. The measured force required to effect removal of each dressing sample was reported (as an average of 6-16 sample replications) in Newtons per decimeter (N/dm). To adhere to wet skin, is is desirable that the (T0) wet value is greater than about 0.8 N/dm and it is desired that the (T0) wet value is approximately the same as the (T0) dry value.

180° Peel Adhesion Strength

Peel adhesion strength was measured in the following manner, which generally followed the procedure described in ASTM D 3330-90. Peel adhesion strength was measured at 72° F. (22° C.) and 50% relative humidity (RH) using a Zwick model Z005 tensile tester (Zwick USA, Kennesaw, GA). A tape test specimen measuring 1 inch (2.54 centimeters) wide by approximately 5 inches (12.7 centimeters) long was applied to a pre-cleaned, flat, rigid substrate (either stainless steel (SS), polypropylene (PP), polyethylene (PE), or polyvinyl chloride (PVC)). Substrates were cleaned by wiping once with a solvent (either methyl ethyl ketone or heptane) and a clean lint free tissue, then allowed to air dry prior to use. SS substrates were 0.052 inches (1.31 millimeters) thick, PP and PE substrates were 0.188 inches (4.76 millimeters) thick, and PVC substrates were 0.0625 inches (1.59 millimeters) thick. To apply the tape specimen to the substrate, a mechanical roller machine or hand operated 4.5 pound (ca. 2 kilogram) hard rubber roller was used to ensure intimate contact with the substrate surface. The hand operated roller was used at a rate of approximately 2 inches (50 millimeters)/second with no additional force. A setting of 120 inches/minute (305 cm/min) was used with the mechanical roller machine. The test specimen was either tested immediately after preparation (i.e., an immediate dwell time, reported as "Instant Peel" or T0) or was equilibrated (dwelled) for the reported hours, such as 24 or 72 hours at 72° F. (22° C.) and 50% relative humidity prior to testing (reported as T24 Peel or T72 Peel, respectively). The free end of the tape test specimen was attached to the load cell apparatus and the specimen was oriented to provide a peel angle of 180°. The substrate was attached to the moveable platen on the instrument. The peel adhesion test was run at a constant rate of 12 inches (30.48 centimeters)/ minute and the average peel adhesion force was recorded in ounces/inch. The results of five measurements were averaged to provide the reported values.

Static Shear Adhesion

Static shear adhesion was measured in the following manner, which generally followed the procedure described in ASTM D 3654-88. Stainless steel (SS) panels measuring 2 inches (5.08 centimeters) by 2 inches (5.08 centimeters) were cleaned by wiping them three times with a solvent (either methyl ethyl ketone or heptane) and a clean lint-free tissue. A tape test specimen measuring 1 inch (2.54 centimeters) wide by approximately 2 inches (5.08 centimeters) long was centered on a cleaned panel and adhered to one end such that the tape test specimen overlapped the panel by 1 inch (2.54 centimeters) in the lengthwise direction and the tape specimen edges were parallel with the edges of the panel. The tape test specimen was then rolled down one time in each direction using a 4.5 pound (ca. 2 kilogram) rubber roller. The tape test specimen/test panel assembly was conditioned for 24 hours at room temperature and then suspended in a stand at room temperature and the panel tilted at an angle of 2 degrees from vertical to ensure a shear force. A-500250 gram weight was hung from the free end of the tape test specimen. The time, in minutes, for the tape test specimen to fall from the panel was recorded. The test was terminated if failure had not occurred in 10,000 minutes and the result recorded as "10,000+".

Preparation of Examples

In the case of each polymer or polymer mixture, molten components were added to a twin-screw extruder (temperature maintained at less than or equal to 140-165° C.) equipped with a contact die coating station, blended until homogeneous, and then coated onto a substrate backing. Coating conditions involved setting the gear pump, flexible hose and contact coating die to the same temperature that was in the range of 142-163° C. The gear pump and film take-away speeds were adjusted to provide a coating weight recorded as grains per 24 in$^2$ (sample dimensions 4 inch×6 inch).

For Examples 1-3, to create the Bi-layer PSA, Backing 1 was first hot melt coated via the contact die coating station with either PSA-1 or PSA-2 (as shown in Table 3) at 10 grains per 24 in$^2$ and then wound against the low adhesion backsize (LAB) surface of Backing 1. In a second step, the initially coated rolls with PSA-1 or PSA-2 coatings were unwound to serve as the input substrate, and a second layer was hot melt coated via the contact die coating station using PSA-3 at 6 grains per 24 in$^2$. Both adhesive layers were then UV cured using the dosage shown in Tables 3 and 4, and wound onto the LAB-coated surface of the substrate. When two UV dose numbers are provided, this represents one film with two layers of adhesive making two passes through the UV apparatus. The adhesive laminates were slit into 1 inch (2.5 cm) wide tape rolls with a total of 16 grains per 24 in$^2$ of PSA from the two combined layers of PSA.

For Comparative Example CE-1 a single layer of PSA-1 was coated on Backing 1 with coating weight of 16 grains per 24 in$^2$ and UV cured using the dosage shown in Table 3. For Comparative Example CE-2 a single layer of PSA-2 was coated on Backing 1 with coating weight of 16 grains per 24 in$^2$ and UV cured using the dosage shown in Table 3.

TABLE 3

| Example | Layer 1 Composition (thickness, grains per 24 in) | Layer 2 Composition (thickness, grains per 24 in) | UV Dosage |
|---|---|---|---|
| 1 | PSA-1 (10) | PSA-3 (6) | 37% + 50% |
| 2 | PSA-1 (10) | PSA-3 (6) | 75% + 50% |
| 3 | PSA-2 (10) | PSA-3 (6) | 0% |
| CE-1 | PSA-1 (16) | — | 100% |
| CE-2 | PSA-2 (16) | — | 0% |

If no second layer PSA was coated, then the first coating pass was used at the noted coating weight and UV dose.

TABLE 4

| UV cure settings and dose. | |
|---|---|
| UV setting (%) | UV dose (mJ/cm$^2$) |
| 100 | 85.5 |
| 75 | 59.5 |
| 50 | 36.5 |
| 25 | 12 |

For Examples 4-6, to create the Bi-layer PSA, Backing 1 was first hot melt coated via the contact die coating station with either PSA-1 or PSA-2 (as shown in Table 5) at 10 grains per 24 in$^2$ and then wound against the low adhesion backsize (LAB) surface of Backing 1. In a second step, the initially coated rolls with PSA-1 or PSA-2 coatings were unwound to serve as the input substrate, and a second layer was hot melt coated via the contact die coating station using PSA-4 at 6 grains per 24 in$^2$. Both adhesive layers were then UV cured using the dosage shown in Tables 3 and 4, and wound onto the LAB-coated surface of the substrate. When two UV dose numbers are provided, this represents one film with two layers of adhesive making two passes through the UV apparatus corresponding to the dosages shown in Table 4. The adhesive laminates were slit into 1 inch (2.5 cm) wide tape rolls with a total of 16 grains per 24 in$^2$ of PSA from the two combined layers of PSA.

For Comparative Example CE-1 a single layer of PSA-1 was coated on Backing 1 with coating weight of 16 grains per 24 in$^2$ and UV cured using the dosage shown in Table 5. For Comparative Example CE-2 a single layer of PSA-2 was coated on Backing 1 with coating weight of 16 grains per 24 in$^2$ and UV cured using the dosage shown in Table 5.

TABLE 5

| Example | Layer 1 Composition (thickness, grains per 24 in) | Layer 2 Composition (thickness, grains per 24 in) | UV Dosage |
|---|---|---|---|
| 4 | PSA-1 (10) | PSA-4 (6) | 37% + 50% |
| 5 | PSA-1 (10) | PSA-4 (6) | 75% + 50% |
| 6 | PSA-2 (10) | PSA-4 (6) | 0% + 50% |
| CE-1 | PSA-1 (16) | — | 100% |
| CE-2 | PSA-2 (16) | — | 0% |

If no second layer PSA was coated, then the first coating pass was used at the noted coating weight and UV dose.

Testing

Examples 4-6 and Comparative Examples CE-3 and CE-4 were tested for Static Shear Adhesion according to the test method given above. Comparative Example CE-3 is Tape-1, and Comparative Example CE-4 is Tape-2. The Results are shown in Table 6.

TABLE 6

Shear testing results (minutes to failure).

| Example | Minutes |
| --- | --- |
| Example 4 | 591 |
| Example 5 | 1898 |
| Example 6 | 1040 |
| CE-3 | 519 |
| CE-4 | 55 |

Examples 4-6 and Comparative Examples CE-3 and CE-4 were tested for Skin Adhesion according to the test method given above. Comparative Example CE-3 is Tape-1, and Comparative Example CE-4 is Tape-2. The Results are shown in Table 7. The data shows that the current examples do not have a high adhesion build.

TABLE 7

Peel adhesion to skin.

| Example | T0 Peel Adhesion to skin (g/in) | T24 Peel Adhesion to skin (g/in) | T72 Peel Adhesion to skin (g/in) |
| --- | --- | --- | --- |
| 4 | 44.27 | 106.91 | 106.10 |
| 5 | 38.61 | 108.79 | 93.63 |
| 6 | 34.64 | 98.97 | 115.03 |
| CE-1 | 78.36 | 229.68 | 253.58 |
| CE-2 | 350.34 | 418.30 | 388.08 |
| CE-3 | 58.37 | 152.75 | 230.65 |
| CE-4 | 43.20 | 25.61 | 6.35 |

Wet Skin Adhesion Testing was carried out for Examples 5 and 6, CE-3, and CE-5. CE-5 is Tape-3. The data are presented in Table 8.

TABLE 8

Wet skin peel adhesion testing results

| EXAMPLE | T0 ADHESION (g/in.) | T48 ADHESION (g/in.) |
| --- | --- | --- |
| Example 5 | 37.1 | 76.61 |
| Example 6 | 30.70 | 83.94 |
| CE-3 | 42.66 | 61.85 |
| CE-5 | 134.13 | 191.18 |

Examples 4-6 and Comparative Examples CE-1 and CE-2 were tested for Peel Adhesion to stainless steel, PVC, PE and PP at T0, T24, and T72, according to the test method given above. The Results are shown in Table 9.

TABLE 9

Peel adhesion to stainless steel, PVC, PE and PP at T0, T24, and T72.

| Example | SS | PE | PP | PVC |
| --- | --- | --- | --- | --- |
| T0 Peel | | | | |
| 4 | 3.394 | 6.2 | 13.388 | 14.464 |
| 5 | 3.602 | 4.8 | 13.848 | 14.192 |
| 6 | 3.596 | 2.544 | 14.452 | 23.562 |
| CE-1 | 6.936 | 7.454 | 16.402 | 21.334 |
| CE-2 | 22.928 | 7.6 | 21.224 | 32.592 |
| T24 Peel | | | | |
| 4 | 17.92 | 13.426 | 24.142 | 30.91 |
| 5 | 18.534 | 18.474 | 29.494 | 36.3 |
| 6 | 24.648 | 15.974 | 32.05 | 49.70 |
| CE-1 | 20.382 | 14.346 | 22.586 | 62.838 |
| CE-2 | 51.142 | 33.078 | 40.79 | 91.15 |
| T72 Peel | | | | |
| 4 | 24.72 | 23.198 | 28.05 | 26.4 |
| 5 | 23.26 | 22.274 | 28.158 | 31.818 |
| 6 | 34.03 | 23.638 | 35.444 | 52.39 |
| CE-1 | 29.054 | 18.056 | 25.68 | 54.866 |
| CE-2 | 71.85 | 22.81 | 41.386 | 97.45 |

Comparative Blend Examples CE-6-CE-8:

To test if the same effect shown for bilayer adhesives could be achieved by simply blending together the two PSAs as a single layer, a series of Comparative Examples were prepared and tested. Comparative Example CE-6 is PSA-2, Comparative Example CE-7 is a 50/50 blend by weight of PSA-2 and PSA-4, and Comparative Example CE-8 is PSA-4. The adhesive or adhesive mixture was blended in line with a twin screw extruder and contact die coated onto Backing 1. The adhesives were pattern coated with a 32% open pattern with ovals and then UV cured at 50% power. Peel adhesion testing was conducted of samples according to the test method described above. The Data are presented in Table 10. The blended adhesive composition shows differing peel adhesion values from each adhesive by itself, but the effects shown for the bilayer adhesive articles of this disclosure are not achieved by blending of the two adhesive compositions.

TABLE 10

Peel adhesion to stainless steel, PVC, PE and PP at T0, T24, and T72.

| Example | SS | PE | PP | PVC |
| --- | --- | --- | --- | --- |
| T0 Peel | | | | |
| CE-6 | 14.92 | 8.40 | 13.82 | 17.73 |
| CE-7 | 12.42 | 5.44 | 11.04 | 8.66 |
| CE-8 | 9.05 | 7.58 | 15.18 | 9.53 |
| T24 Peel | | | | |
| CE-6 | 24.61 | 15.61 | 20.15 | 45.43 |
| CE-7 | 22.12 | 10.39 | 14.58 | 27.34 |
| CE-8 | 14.05 | 13.11 | 17.15 | 19.36 |
| T72 Peel | | | | |
| CE-6 | 38.37 | 15.89 | 25.49 | 55.75 |
| CE-7 | 29.27 | 12.99 | 15.06 | 26.42 |
| CE-8 | 19.32 | 13.96 | 15.45 | 18.03 |

Example 7 and Comparative Example CE-9:

In Example 7, samples of Backing 1 coated with PSA-5 at 6 grains per 24 in$^2$ was rotary rod die coated with PSA-4 in a 32% open pattern with ovals at 6 grains per 24 in$^2$ and UV cured at 50% power. Example 7 and Comparative Example CE-9 were tested for Peel Adhesion using the test method described above. Comparative Example CE-9 is Tape 4. The Results are shown in Table 11. Example 7 and Comparative Example CE-9 were tested for Peel Adhesion to Wet PVC using the test method described above. The Results are shown in Table 12.

TABLE 11

Peel adhesion (oz/in) of Example 7 and CE-9.

| Example # | Time | SS | PP | PE | PVC |
|---|---|---|---|---|---|
| Example 7 | T0 | 9.96 | 11.43 | 4.05 | 10.45 |
| CE-9 | | 12.63 | 13.61 | 13.69 | 26.83 |
| Example 7 | T24 | 25.88 | 24.5 | 21.95 | 19.47 |
| CE-9 | | 14.32 | 24.81 | 9.81 | 37.53 |
| Example 9 | T72 | 26.98 | 20.34 | 16.25 | 19.18 |
| CE-9 | | 16.98 | 17.56 | 9.37 | 24.04 |

TABLE 12

Peel Adhesion to Wet PVC.

| Example # | Peel from Wet PVC (oz/inch) | | |
|---|---|---|---|
| | T0 | T24 | T72 |
| Example 7 | 20.24 | 17.84 | 16.98 |
| CE-9 | 15.29 | 17.41 | 22.54 |

Examples 8, 9 and Comparative Example CE-10:

To determine if the process of disposing the patterned second layer of adhesive affected the properties, a series of samples of Example 8 were generated using different processes, Examples 8A, and 8B. In Example 9 the backing was coated with PSA-4 and overcoated with a pattern coating of PSA-5. Comparative Example C-10 is Tape 5.

In Example 8, samples of Backing 1 were coated with PSA-5 and UV cured at 50% power. To samples of this coated tape article two different processes were carried out.

Process 1:

In Process 1 for Example 8A, a portion of the coated tape was patterned coated with PSA-4 at 6 grains per 24 in² with a 32% open pattern with ovals and then UV cured at 50% power.

Process 2:

In Process 2 for Example 8B, a release liner was patterned coated with PSA-4 at 6 grains per 24 in² with a 32% open pattern with ovals. This adhesive-coated release liner was then laminated to a portion of the coated tape and then UV cured at 50% power.

In Example 9, samples of Backing 1 were coated with PSA-4 at 6 grains per 24 in² and UV cured at 50% power. A second layer comprising PSA-5 was then pattern coated in a 32% open pattern with ovals at 6 grains per 24 in² and UV cured at 50% power. The Wet PVC Peel Adhesion results was measured according to the test method described above. The Results are presented in Table 13.

TABLE 13

Wet PVC Peel Adhesion (oz/inch) results.

| Adhesive Tape Sample | T0 | T24 | T72 |
|---|---|---|---|
| Exmaple 8A | 14.1 | 19.4 | 20.7 |
| Example 8B | 21.1 | 24.3 | 17.2 |
| Example 9 | 23.5 | 29.3 | 19.4 |
| Comparative Example CE-10 | 17.1 | 26.3 | 15.9 |

What is claimed is:

1. An adhesive article, comprising:
    a first substrate comprising a first major surface and a second major surface; and
    a multi-layered adhesive comprising:
    a layer of a first adhesive with a first major surface and a second major surface, wherein the second major surface of the first adhesive is in contact with the first major surface of the first substrate, wherein the first adhesive comprises a (meth)acrylate-based pressure sensitive adhesive, wherein the (meth)acrylate-based pressure sensitive adhesive comprises
        a UV initiator;
        a (meth)acrylate co-polymer of at least one alkyl (meth) acrylate monomer; and
        at least one reinforcing monomer; and
    a hot melt coated layer of siloxane-based pressure sensitive adhesive with a first major surface and a second major surface, the layer of siloxane-based pressure sensitive adhesive comprising a siloxane-(meth)acrylate co-polymer, wherein the siloxane-(meth)acrylate co-polymer comprises a reaction product of a reaction mixture comprising:
        at least one ethylenically unsaturated siloxane-containing macromer;
        at least one alkyl (meth)acrylate monomer; and
        at least one reinforcing monomer, a UV initiator,
    wherein the multi-layered adhesive has been exposed to UV radiation;
    wherein the second major surface of the siloxane-based pressure sensitive adhesive is in contact with the first major surface of the layer of the first adhesive, the layer of the first adhesive is crosslinked to the hot melt coated layer of siloxane-based pressure sensitive adhesive,
    wherein a thickness of the layer of the siloxane-based pressure sensitive adhesive is less than a of the layer of the first adhesive,
    wherein the multi-layered adhesive has a Static Shear Holding Power value of at least 10,000 minutes, when measured according to ASTM 3654-88 using a 250 gram weight.

2. The adhesive article of claim 1, wherein the first substrate is selected from the group consisting of a polymeric film, a fabric, a non-woven, a foam, a paper, a mesh, an adhesive, and a release liner.

3. The adhesive article of claim 1, wherein the multi-layered adhesive has a total thickness of from 25-100 micrometers, wherein the thickness of the layer of siloxane-based pressure sensitive adhesive comprises 25% or less of the total thickness of the multi-layered adhesive.

4. The adhesive article of claim 1, wherein the layer of siloxane-based pressure sensitive adhesive comprises a discontinuous layer.

5. The adhesive article of claim 1, further comprising a second substrate, wherein the second substrate is in contact with the first major surface of the siloxane-based pressure sensitive adhesive.

6. The adhesive article of claim 1, wherein the layer of siloxane-based pressure sensitive adhesive is formed via an adiabatic reaction process.

7. The adhesive article of claim 1, wherein the UV initiator is copolymerized into the siloxane-based pressure sensitive adhesive prior to exposure of the multi-layered adhesive to the UV radiation.

\* \* \* \* \*